United States Patent
Oh et al.

(10) Patent No.: US 8,708,215 B2
(45) Date of Patent: Apr. 29, 2014

(54) SOLDER BALL SUPPLYING APPARATUS

(71) Applicant: Samsung Electro-Mechanics Co., Ltd., Gyeonggi-do (KR)

(72) Inventors: Hueng Jae Oh, Gyeonggi-do (KR); Yon Ho You, Gyeonggi-do (KR); Jin Won Choi, Gyeonggi-do (KR)

(73) Assignee: Samsung Electro-Machanics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/894,312

(22) Filed: May 14, 2013

(65) Prior Publication Data

US 2013/0306709 A1    Nov. 21, 2013

(30) Foreign Application Priority Data

May 17, 2012    (KR) ........................ 10-2012-0052573

(51) Int. Cl.
    *B23K 37/00*    (2006.01)
(52) U.S. Cl.
    USPC .............................................. 228/41; 228/42
(58) Field of Classification Search
    None
    See application file for complete search history.

(56) References Cited

U.S. PATENT DOCUMENTS

| | | | |
|---|---|---|---|
| 5,655,704 A * | 8/1997 | Sakemi et al. | 228/246 |
| 6,003,753 A * | 12/1999 | Hwang et al. | 228/41 |
| 6,056,190 A * | 5/2000 | Foulke et al. | 228/246 |
| 6,182,356 B1 * | 2/2001 | Bolde | 29/821 |
| 6,253,992 B1 * | 7/2001 | Fjelstad | 228/245 |
| 6,270,002 B1 * | 8/2001 | Hayashi et al. | 228/246 |
| 6,336,581 B1 * | 1/2002 | Tuchiya et al. | 228/33 |
| 6,390,351 B1 * | 5/2002 | Kasai et al. | 228/41 |
| 6,604,673 B1 * | 8/2003 | Bourrieres et al. | 228/246 |
| 7,455,209 B2 * | 11/2008 | Bourrieres et al. | 228/41 |
| 2002/0058406 A1 * | 5/2002 | Mukuno et al. | 438/626 |
| 2002/0092376 A1 * | 7/2002 | Nozawa | 75/335 |
| 2003/0127501 A1 * | 7/2003 | Cheng et al. | 228/246 |
| 2004/0149805 A1 * | 8/2004 | Ito | 228/41 |
| 2005/0045701 A1 * | 3/2005 | Shindo et al. | 228/246 |
| 2005/0056682 A1 * | 3/2005 | Cobbley et al. | 228/41 |
| 2008/0296355 A1 * | 12/2008 | Costales et al. | 228/246 |
| 2008/0301935 A1 * | 12/2008 | Iida et al. | 29/843 |
| 2009/0026247 A1 * | 1/2009 | Sakaguchi et al. | 228/180.22 |
| 2009/0159646 A1 * | 6/2009 | Tanaka et al. | 228/176 |
| 2010/0044412 A1 * | 2/2010 | Kajii | 228/41 |
| 2010/0044413 A1 * | 2/2010 | Kajii | 228/41 |
| 2010/0213243 A1 * | 8/2010 | Azdasht et al. | 228/18 |
| 2010/0272884 A1 * | 10/2010 | Igarashi et al. | 427/126.1 |
| 2011/0315747 A1 * | 12/2011 | Yamamoto et al. | 228/248.1 |
| 2012/0000963 A1 * | 1/2012 | Park | 228/41 |
| 2013/0171816 A1 * | 7/2013 | Jin | 438/613 |

FOREIGN PATENT DOCUMENTS

| | | | |
|---|---|---|---|
| JP | 11-186704 A | * | 7/1999 |
| KR | 10-2006-0016939 A | | 2/2006 |
| KR | 10-2010-0005113 A | | 1/2010 |

* cited by examiner

*Primary Examiner* — Kiley Stoner
(74) *Attorney, Agent, or Firm* — Bracewell & Giuliani LLP; Brad Y. Chin

(57) ABSTRACT

Disclosed herein is a solder ball supplying apparatus including: a cartridge formed in a box shape and having a plurality of solder balls embedded therein; a vibration unit coupled to a lower portion of the cartridge; and a metal mask coupled integrally with a lower portion of the vibration unit and having a plurality of holes formed over the entire surface thereof.

5 Claims, 2 Drawing Sheets

SOLDER BALL SUPPLYING APPARATUS

CROSS REFERENCE(S) TO RELATED APPLICATIONS

This application claims the benefit under 35 U.S.C. Section 119 of Korean Patent Application Ser. No. 10-2012-0052573, entitled "Solder Ball Supplying Apparatus" filed on May 17, 2012, which is hereby incorporated by reference in its entirety into this application.

BACKGROUND OF THE INVENTION

1. Technical Field

The present invention relates to a solder ball supplying apparatus, and more particularly, to a solder ball supplying apparatus for supplying solder balls to accurate positions on a surface of a printed circuit board.

2. Description of the Related Art

Recently, in accordance with miniaturization of electronic apparatuses and improvement of performance of the electronic apparatuses, semiconductor devices such as a semiconductor chip, or the like, have gradually been highly integrated, and an interval between bump patterns of the semiconductor devices has become denser as compared with the related art.

Therefore, a method of forming hemispherical or spherical bumps by a reflow process of injecting a predetermined amount of molten solder onto a substrate on which accommodating parts coinciding with patterns of the semiconductor device are formed and heating the molten solder has been suggested.

That is, after the accommodating parts such as holes or grooves coinciding with the patterns of the semiconductor chip are formed on the substrate by an etching process, when a reflow process of injecting the molten solder into the accommodating parts and heating the molten solder is performed, the molten solder becomes the hemispherical or spherical bumps due to surface tension.

Here, a process of injecting the molten solder into the accommodating parts on the substrate is performed by a molten solder injection head. The molten solder injection head serves to melt bulk solder before being molten and then inject molten solder to a position into which the molten solder is to be injected. In this configuration, the substrate is installed with a mask of which accommodated portions are opened, such that the molten solder is injected into only the accommodating parts of the substrate through the mask.

Meanwhile, in a scheme of supplying a solder ball according to the related art, patterns are formed on a substrate, a metal mask in which holes coinciding with the patterns are formed is aligned with the substrate, and the solder balls are injected through the holes of the metal mask using a squeegee on the metal mask. Then, the reflow process is performed on the substrate into which the solder balls are injected to melt the solder balls, thereby closely adhering and coupling the solder balls onto the patterns of the substrate.

However, in the scheme of supplying a solder ball according to the related art, as a fine pitch specification of the pattern progresses, since it is difficult to align the mask and the substrate with each other, it is difficult to manufacture a mask matched to fine pitch patterns and a manufacturing cost of the fine pitch patterns is increased even though the fine pitch patterns may be manufactured.

In addition, in the case in which the patterns formed on the substrate and the holes formed in the mask are not appropriately aligned with each other, the solder balls are not injected onto upper surfaces of the patterns, but are injected into erroneous positions in the vicinity of the patterns, such that a defect occurs in the substrate.

RELATED ART DOCUMENT

Patent Document (Patent Document 1) Korean Patent Laid-Open Publication No. 2006-016939

SUMMARY OF THE INVENTION

An object of the present invention is to provide a solder ball supplying apparatus capable of allowing solder balls to be injected into accurate positions on patterns formed on a printed circuit board.

Another object of the present invention is to provide a solder ball supplying apparatus capable of allowing solder balls to be injected at positions at which holes formed in a mask coincide with patterns by including a vibration unit disposed at a lower portion of a cartridge in which the solder balls are stored and having the mask formed integrally therewith.

According to an exemplary embodiment of the present invention, there is provided a solder ball supplying apparatus including: a cartridge formed in a box shape and having a plurality of solder balls embedded therein; a vibration unit coupled to a lower portion of the cartridge; and a metal mask coupled integrally with a lower portion of the vibration unit and having a plurality of holes formed over the entire surface thereof.

The vibration unit may be mounted at an upper end of a support body, wherein the support body is coupled to an upper portion of the metal mask at a predetermined height, such that a movement space of the solder balls is formed under the cartridge.

The vibration unit may be a vibrator or a linear motor vibrated in a horizontal direction with respect to an upper surface of the metal mask coupled to the lower portion thereof.

The cartridge may include a nitrogen gas inlet formed at one side thereof in order to inject nitrogen ($N_2$) gas, such that an inner portion of the cartridge is maintained under a nitrogen atmosphere.

DESCRIPTION OF THE PREFERRED EMBODIMENTS

The acting effects and technical configuration for accomplishing the above objects of a solder ball supplying apparatus according to the present invention will be clearly understood by the following description in which exemplary embodiments of the present invention are described with reference to the accompanying drawings.

Figure 1:
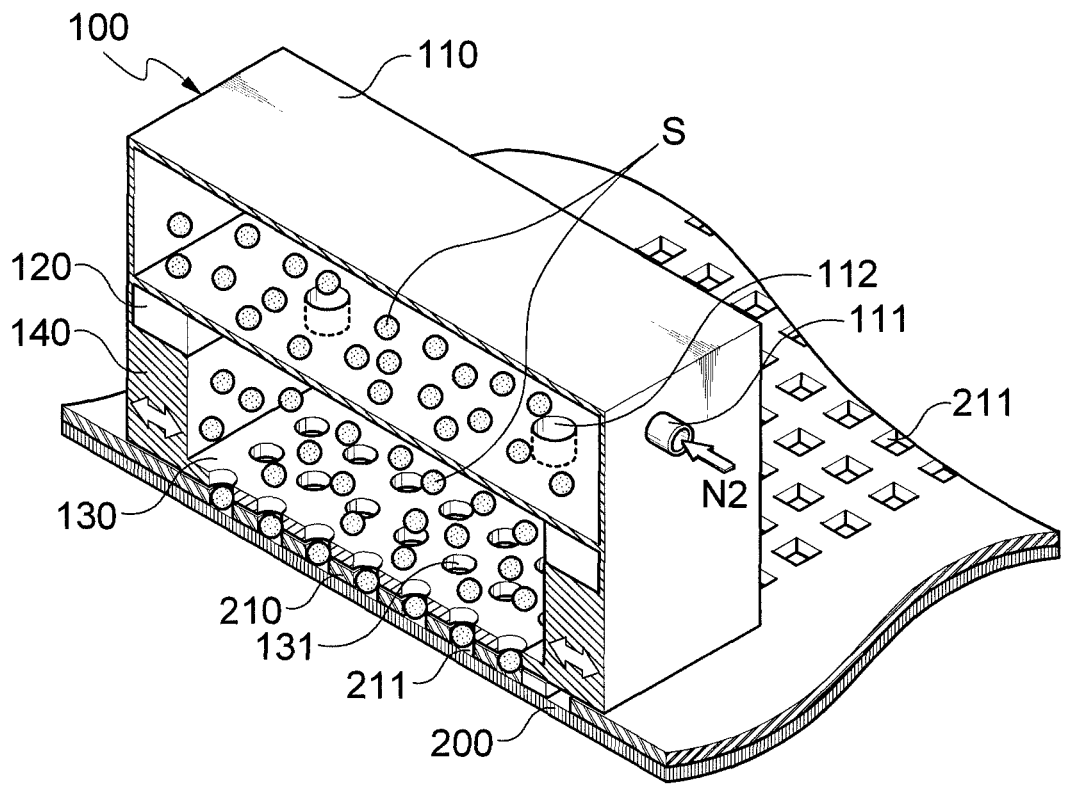
FIG. 1 is a perspective view of a solder ball supplying apparatus according to an exemplary embodiment of the present invention.
Figure 2:
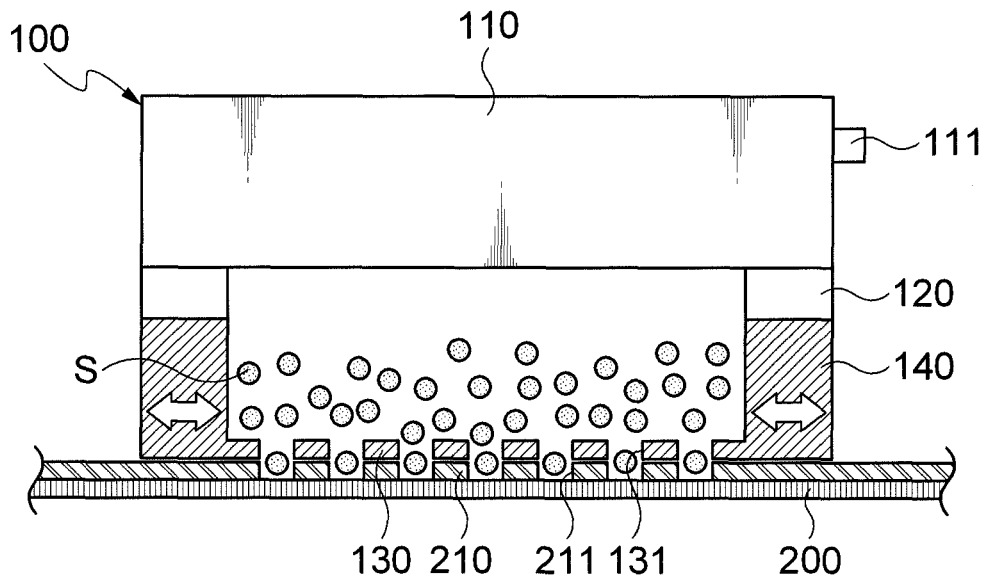
FIG. 2 is a cross-sectional view of the solder ball supplying apparatus according to the exemplary embodiment of the present invention.
Figure 3:
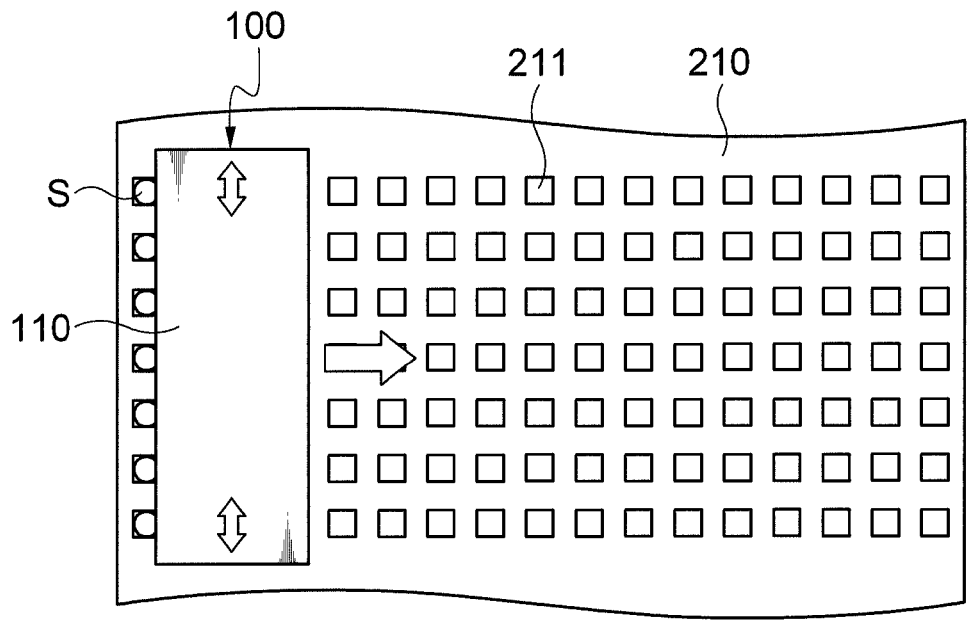
FIG. 3 is a plan view showing a state in which the solder ball supplying apparatus according to the exemplary embodiment of the present invention is driven.

First, FIG. 1 is a perspective view of a solder ball supplying apparatus according to an exemplary embodiment of the present invention; and FIG. 2 is a cross-sectional view of the solder ball supplying apparatus according to the exemplary embodiment of the present invention; and FIG. 3 is a plan view showing a state in which the solder ball supplying apparatus according to the exemplary embodiment of the present invention is driven.

As shown in FIGS. 1 to 3, the solder ball supplying apparatus 100 according to the exemplary embodiment of the present invention may be configured to include a cartridge 110, a vibration unit 120, and a metal mask 130. In addition, the vibration unit 120 and the metal mask 130 may be formed integrally with each other, having a support body 140 interposed therebetween.

The cartridge 110 may be formed in a box shape, have a plurality of solder balls S embedded therein, and nitrogen ($N_2$) gas is injected into an inner portion of the cartridge 110, such that the inner portion of the cartridge 110 may be maintained under a nitrogen gas atmosphere. The reason why the inner portion of the cartridge 110 is maintained under the nitrogen gas atmosphere is to prevent oxidation of the solder balls embedded in the cartridge 110. Therefore, the cartridge 110 may include a nitrogen gas inlet 111 formed at one side thereof in order to fill the nitrogen gas therein. In addition, the cartridge 110 may further include a solder ball outlet 112 formed at a lower portion thereof in order to discharge the embedded solder balls to the outside.

The cartridge 110 may have the vibration unit 120 coupled to the lower portion thereof. The vibration unit 120 may be a vibrator, a linear motor, or the like, that may be vibrated by itself and allow components coupled thereto to be horizontally vibrated.

That is, the vibration unit 120 may be formed of a medium transferring vibration to a lower portion thereof, and the solder balls S discharged from the cartridge 110 by the vibration of the vibration unit 120 may be aligned on the metal mask 130 horizontally vibrated together with the vibration unit 120. Here, the vibration unit 120 may be a vibration unit 120 having upward vibration force so that the cartridge 110 coupled to an upper portion thereof may also be vibrated in addition to horizontal vibration of the metal mask 130, which is a component disposed at the lower portion thereof.

The vibration unit 120 may have the metal mask 130 coupled to the lower portion thereof. Here, the metal mask 130 may be supported by the support body 140 mounted thereon at a predetermined height so as to have a predetermined movement space of the solder balls S between the metal mask 130 and the cartridge 110 disposed thereover.

In addition, the metal mask 130 may be seated on a substrate 200 and have a plurality of holes 131 formed at predetermined intervals over the entire surface thereof. Here, it is preferable that the hole 131 has a diameter at which the solder balls S are introduced thereinto, and it is more preferable that the hole 131 has a diameter larger than an average diameter of the solder balls S so that the solder balls S may be smoothly introduced thereinto.

The metal mask 130 may have both side portions coupled integrally with a lower portion of the support body 140 to receive vibration force of the vibration unit 120 through the support body 140 and may be vibrated by the vibration unit 120 to allow the solder balls S discharged from the cartridge 110 to be aligned in the movement space under the cartridge 110 and then introduced into the holes 131 thereof.

The solder ball supplying apparatus 100 according to the exemplary embodiment of the present invention configured as described above moves to one side on the substrate 200. More specifically, the solder ball supplying apparatus 100 moves to one side while the vibration is made in a direction orthogonal to a movement direction of the solder ball supplying apparatus 100.

That is, as shown in FIGS. 1 and 3, the metal mask 130 is vibrated by the vibration unit 120 vibrated in the direction orthogonal to the movement direction of the solder ball supplying apparatus 100 while the solder ball supplying apparatus 100 moves to one side on the substrate 200 having a photosensitive mask 210 formed on an upper surface thereof, thereby making it possible to allow the solder balls S introduced into the holes 131 of the metal mask 130 to be aligned in grooves 211 formed in the photosensitive mask 210 disposed on the upper surface of the substrate 200.

Therefore, the solder ball supplying apparatus 100 may allow the solder balls S to be easily aligned while moving to one side on the substrate 200.

Figure 4:
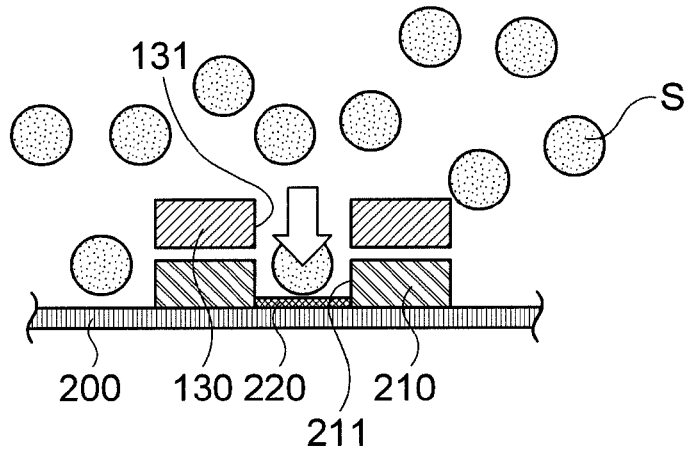
FIGS. 4 and 5 are views showing a process in which solder balls are arranged through the solder ball supplying apparatus according to the exemplary embodiment of the present invention.
Figure 5:
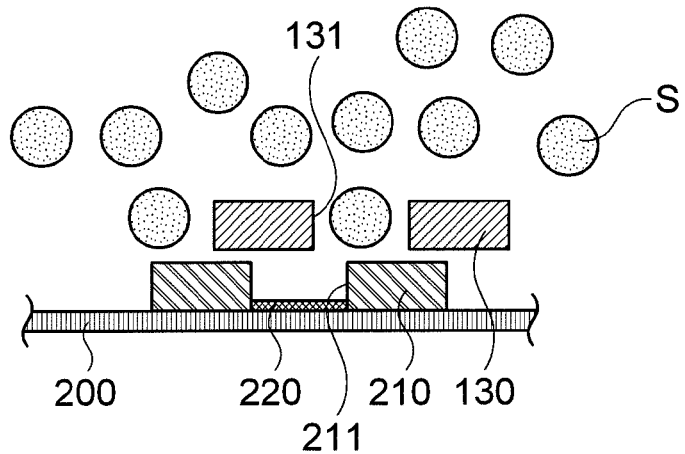

Meanwhile, FIGS. 4 and 5 are views showing a process in which solder balls are arranged through the solder ball supplying apparatus according to the exemplary embodiment of the present invention.

As shown in FIGS. 4 and 5, the solder ball supplying apparatus 100 according to the exemplary embodiment of the present invention is configured of a single module in which the cartridge 110, the vibration unit 120, and the metal mask 130 are formed integrally with one another as described above and allows the solder balls S embedded in the cartridge 110 to be supplied onto the substrate 200 by vibrating the metal mask 130 by the vibration unit 120.

Here, the solder ball supplying apparatus 100 may supply the solder balls S onto the substrate 200 on which molten solders are to be formed by a reflow process, and the photosensitive mask 210 in which patterns 220 to which the solder balls are to be coupled are opened may be formed on the substrate 200. The photosensitive mask 210, which is a mask layer removed by light irradiation when the solder balls S are molten by the reflow process to thereby be bonded on the patterns 220, may be used as a reference position capable of allowing the solder balls S to be disposed at accurate positions on the patterns 220.

The solder ball supplying apparatus 100 moving to one side on the substrate 200 on which the photosensitive mask 210 is formed may dispose the solder balls S discharged from the cartridge 110 by the vibration of the vibration unit 120 on the patterns 220 of the substrate 200 as shown in FIG. 4 through the metal mask 130.

When the photosensitive mask 210 formed on the substrate 200 and the metal mask 130 of the solder ball supplying apparatus 100 are matched to each other, that is, when the grooves 211 formed in the photosensitive mask 210 and the holes 131 formed in the metal mask 130 coincide with each other while the metal mask 130 of the solder ball supplying apparatus 100 is vibrated on the substrate 200 on which the photosensitive mask 210 is formed, the solder balls S may be disposed on the patterns 220 formed on the substrate 200 in a one-to-one scheme.

In addition, when the photosensitive mask 210 and the metal mask 130 are not matched to each other, as shown in FIG. 5, the solder balls S introduced into the holes 131 of the metal mask 130 are not directly introduced into the grooves 211 of the photosensitive mask 210, but are introduced into the grooves 211 of the photosensitive mask 210 by horizontal movement of the metal mask 130 by the vibration of the metal mask 130.

As described above, the solder ball supplying apparatus according to the exemplary embodiment of the present invention allows the solder balls S to be injected in the case in which the photosensitive mask 210 and the horizontally moving metal mask 130 are aligned with each other while moving in a length direction of the photosensitive mask 210 formed on the substrate 200 and the substrate 200, thereby making it possible to easily dispose the solder balls S at accurate pattern forming positions on the substrate 200.

As set forth above, with the solder ball supplying apparatus according to the exemplary embodiment of the present invention, when the holes of the metal mask horizontally vibrated by the vibration unit are matched to the grooves of the photosensitive mask formed on the substrate, the solder balls are disposed on the patterns of the substrate, such that the solder balls may be supplied to accurate positions.

Therefore, according to the exemplary embodiment of the present invention, the solder balls may be easily supplied onto the substrate on which fine pitch patterns are formed are formed and be supplied by the vibration, such that damage to the solder balls may be prevented.

In addition, according to the exemplary embodiment of the present invention, the nitrogen gas is continuously injected into the cartridge, such that a plurality of solder balls are exposed to the nitrogen gas atmosphere, thereby making it possible to increase a lifespan of the solder balls.

Further, according to the exemplary embodiment of the present invention, when the solder balls are injected onto the patterns between the photosensitive masks, friction between the solder ball and the photosensitive mask is minimized, thereby making it possible to minimize generation of non-metallic foreign materials and suppress generation of static electricity between the photosensitive mask and the solder ball.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A solder ball supplying apparatus, comprising:
   a cartridge formed in a box shape and having a plurality of solder balls embedded therein;
   a vibration unit coupled to a lower portion of the cartridge; and
   a metal mask coupled integrally with a lower portion of the vibration unit and having a plurality of holes,
   wherein the vibration unit is mounted at an upper end of a support body, the support body being coupled to an upper portion of the metal mask, such that a movement space of the solder balls is formed under the cartridge.

2. The solder ball supplying apparatus according to claim 1, wherein the vibration unit is a vibrator or a linear motor vibrated in a horizontal direction with respect to an upper surface of the metal mask coupled to the lower portion thereof.

3. The solder ball supplying apparatus according to claim 2, wherein the vibration unit is vibrated in a direction orthogonal to a movement direction of the solder ball supplying apparatus.

4. The solder ball supplying apparatus according to claim 1, wherein the cartridge includes a nitrogen gas inlet formed at one side thereof in order to inject nitrogen ($N_2$) gas, and an inner portion of the cartridge is maintained under a nitrogen atmosphere by the nitrogen gas injected through the nitrogen gas inlet.

5. The solder ball supplying apparatus according to claim 4, wherein the cartridge further includes a solder ball outlet formed at the lower portion thereof.

* * * * *